(12) United States Patent
Holmes et al.

(10) Patent No.: US 7,628,969 B2
(45) Date of Patent: Dec. 8, 2009

(54) MULTIFUNCTIONAL ABATEMENT OF AIR POLLUTANTS IN FLUE GAS

(75) Inventors: Michael J. Holmes, Thompson, ND (US); John H. Pavlish, East Grand Forks, MN (US); Ye Zhuang, Grand Forks, ND (US); Steven A. Benson, Grand Forks, ND (US); Edwin S. Olson, Grand Forks, ND (US); Jason D. Laumb, Grand Forks, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 0 days.

(21) Appl. No.: 12/177,771

(22) Filed: Jul. 22, 2008

(65) Prior Publication Data

US 2009/0047200 A1    Feb. 19, 2009

Related U.S. Application Data

(63) Continuation-in-part of application No. 11/220,810, filed on Sep. 7, 2005, now abandoned.

(51) Int. Cl.
 B01D 53/52    (2006.01)
 C01B 17/00    (2006.01)
(52) U.S. Cl. ............ 423/242.1; 423/242.2; 423/243.01; 423/243.02; 423/243.08
(58) Field of Classification Search ...... 423/210–245.1; 110/203, 215, 345; 95/235
 See application file for complete search history.

(56) References Cited

U.S. PATENT DOCUMENTS 6,808,692 B2 * 10/2004 Oehr ........................ 423/210
2007/0231230 A1 * 10/2007 Meserole et al. ............ 423/221

* cited by examiner

Primary Examiner—Melvin C Mayes
Assistant Examiner—Bijay S Saha
(74) Attorney, Agent, or Firm—Conley Rose, P.C.

(57) ABSTRACT

An apparatus and a method that uses generated alkaline, alkaline-earth, and/or silica/alumina aerosols as a multifunctional additive to scavenge sulfur oxides in flue gas, minimize poisoning effects of sulfur oxides on mercury sorbent performance, and enhance particulate matter capture in electrostatic precipitators and other particulate filter devices by conditioning the fly ash.

24 Claims, 5 Drawing Sheets

MULTIFUNCTIONAL ABATEMENT OF AIR POLLUTANTS IN FLUE GAS

CROSS-REFERENCE TO RELATED APPLICATIONS

This application is a continuation-in-part of U.S. patent application Ser. No. 11/220,810 filed Sep. 7, 2005, now abandoned hereby incorporated herein by reference.

STATEMENT REGARDING FEDERALLY SPONSORED RESEARCH OR DEVELOPMENT

This invention was made with U.S. government support under agreement CR 830929-01 awarded by the U.S. Environmental Protection Agency. The government has certain rights to this invention.

BACKGROUND

1. Field of the Invention

The present disclosure relates generally to a system for achieving multi-pollutant control with a single unit applied in any biomass- or coal-fired system. More specifically, the disclosure relates to mercury emission control, particulate matter capture enhancement, and sulfur oxide reduction. Further, the present disclosure relates not only to the control system, but also to a method of operating this system for potential applications.

2. Background of the Invention

Mercury (Hg) emissions have become a health and environmental concern because of their toxicity and ability to bio-accumulate. The U.S. Environmental Protection Agency (EPA) has recently determined that regulation of Hg emissions from coal-fired electric power plants is necessary and appropriate. Recently enacted clean air regulation seek to phase in more stringent mercury emissions over the next several years, creating an urgent need to develop more effective mercury control technologies.

Mercury in flue gas can be captured by injection of sorbents such as carbon, which are removed by subsequent particulate collection devices. Although sorbent injection is, so far, the most mature control technology, the amount of sorbent needed to serve the U.S. market is expected to be large and economically burdensome to implement and maintain. There is a need to develop new methods to minimize changes required for utilities and to reduce costs associated with capital equipment and carbon injection.

Flue gas constituents, especially halogens or halides can impact the fate and form of mercury in the flue gas. Naturally occurring chlorine in coals or halogen compounds that have been added to the fuel are converted in the furnace to the atomic form but being highly reactive, react with flue gas components and each other to form more complex molecular forms. For example, when a halogen such as chlorine is used, reactions with water vapor, $SO_2$, and other flue gas components will occur and will form products such as HCl, $SO_2Cl_2$, and $Cl_2$. As the flue gas cools, reactions of atomic or molecular halogens with elemental mercury will also occur, but are limited depending on other competing reactions discussed above. Heterogeneous reactions with or on particulates can occur in addition to gas phase reactions.

Reactions of atomic halogen species generated in the furnace are kinetically limited and heavily depend on temperature-time profile. The issue is the amount and form of halogen available for oxidation of $Hg^{\circ}$ in the gas phase, or for interaction on the surface of a sorbent.

Horne (Horne, D. G.; Gosavi, R.; Strausz, O. P. *J. Chem. Phys.* 1968, 48, 4758.) determined a rate constant for a Hg+Cl atom by measuring the formation of HgCl using a spectroscopic (279 nm) method for this product. The second-order rate constant for this Hg(I) species was about $1.3 \times 10^{-11}$ $cm^3$ $molecules^{-1}$ $sec^{-1}$. This very fast reaction could be followed by a second reaction to form $HgCl_2$. Using indirect methods, Ariya (Ariya, P. A; Khalizov, A, Gidas, A. J. *Phys. Chem. A* 2002, 106, 7310) determined second-order rate constants for $Hg^{\circ}$ with halogen species as follows: with a Cl atom, $1.0 \times 10^{-11}$ $cm^3$ $molecules^{-1}$ $sec^{-1}$; with a Br atom, $3.2 \times 10^{-12}$ $cm^3$ $molecules^{-1}$ $sec^{-1}$. Thus, the atomic Cl rate constant is about four million times higher than $Cl_2$. However, under a typical temperature profile of a coal-fired utility plant, the atomic Cl generated in the combustion zone has already reacted with other flue gas constituents or itself before it could oxidize elemental mercury at required temperatures.

Because halogen reactivity with mercury is a key factor in control, basic research in this area has been conducted by several investigators. Mamani-Paco and Helble (Mamani-Paco, R. M.; Helble, J. J. In *Proceedings of the A&WMA Annual Conf*; Salt Lake City, AWMA: Pittsburgh, 2000) studied the oxidation of Hg with injected HCl and $Cl_2$, using a quenching system comprising a gradient temperature reaction tube from which samples could be withdrawn for analysis. No oxidation occurred using realistic quench rates with 100 ppm HCl. This is expected: HCl is not an oxidizing agent, since it is already in a highly reduced form. Using a composition containing 50 ppm $Cl_2$ gave only 10% oxidation of $Hg^{\circ}$ while very large amounts (500 ppm) of $Cl_2$ gave 92% oxidation. The implication is that the more reactive atomic chlorine was not available in the system. Sliger et al. (Sliger, R. N.; Kramlich, J. C.; Marinov, N. M. *Fuel Process. Echnol.* 2000, 65-66, 423) injected HCJ and Hg(II) acetate into a natural gas flame and obtained oxidation data consistent with the formation of atomic chlorine and subsequent reaction of a superequilibrium concentration of atomic chlorine with $Hg^{\circ}$ at temperatures of 400 to 700 C. Using a very fast (10×) fast quench rate, Niksa reported up to 40% oxidation at 300 ppm Cl (see: Niksa, S.; Fujiwara, N. *Prepr. Pap. Am. Chem. Soc., Div. Fuel Chem.* 2003, 48 (2), 768).

The Energy & Environmental Research Center (EERC) recently demonstrated significant mercury enrichment in ash when HCl was fed into a high-temperature environment followed by a superfast quenching rate of ~5400° C./s (Zhuang, Y.; Thompson, J. S.; Zygarlicke, C. J.; Galbreath, K. C.; Pavlish, J. P. in *Proceeding of Air Quality IV Mercury, Tmce Elements, and Particulate Matter Conference*; Sep. 22-24, 2003). Only 6% of the elemental form was not oxidized and converted to particulate forms. This experiment implies that atomic chlorine generated in the hot zone was still available at lower temperatures, and thus oxidized the mercury at a lower temperature where Hg—Cl reactions are most probable. While in the end most of the mercury was on the ash, it was not clear whether oxidation occurred in the gas phase or solid phase, or where on the solid phase. Recent results from EERC suggest that a significant portion of mercury is oxidized by reactive halogens in a heterogeneous reaction on carbon particulate surfaces. The initial product of the atomic chlorine reaction with Hg is HgCl, which would readily collect on ash, carbon, or sorbent particulates or react with other species or itself.

Further, EERC pilot-scale experimental data combustion gas has a temperature of between about 100 F. to (Zhuang, Y.; Pavlish, J. H.; Holmes, M. J.; Benson, S. A. Pilot-Scale Study of Advanced Mercury Control Technologies for Lignite-Fired Power Plant in a Retrofit Advanced Hybrid Filter, *Proceed-* ings of the 29th International Technical Conference on Coal Utilization & Fuel Systems; 2004, Vol. 2, pp 753-764) showed that the reactive halogen species formed at high temperatures can not only significantly enhance mercury oxidation but also improve the reactivity of mercury with activated carbon. The atomic, radical, and/or molecular halogen species that are formed, at least momentarily, in the high-energy environment react at high rates with mercury both as gas-phase and solid-gas interactions. Flue gas-quenching rates also play a role in the mercury-halogen chemistry. A high flue gas-quenching rate will preserve the reactive halogen species formed in the high-temperature zone for ongoing mercury oxidation and gas-to-particle conversion.

Recent bench, pilot, and full-scale experimental data at the EERC demonstrate that halogen species can vastly improve mercury capture kinetics and overall control performance of sorbents. Halogen species are able to improve the reactivity of the sorbent surface; thereby increasing the sorbents ability to remove mercury from the flue gas stream.

Part of the insight of the present invention is that because of high reaction rates, it is difficult to preserve reactive halogen species generated in the furnace so that these forms will be available for reaction with $Hg^\circ$ at lower temperatures where the resulting mercury compounds will be stable and more easily captured. The present invention reduces the fundamental teachings of the prior art concerning formation, addition, and rapid transfer of atomic, radical, and or molecular halogen species to a combustion flue gas or product gas from a gasification system into a practical and effective method for mercury control in a utility flue gas stream.

Additionally, the U.S. Environmental Protection Agency (EPA) has acted to restrict emission limits of certain pollutants from coal-fired utility plants further. Specifically, the E.P.A regulations have sought to tighten restrictions of nitrogen oxides ($NO_x$), sulfur oxides ($SO_x$), and mercury emissions to the atmosphere. The new regulations further seek to phase in emissions requirements that are more stringent over the next several years, creating an urgent need to develop improved pollutant control technologies.

It is generally recognized that $NO_x$ emissions may be lowered through selective catalytic reduction (SCR). While experience has shown that SCR can be used to effectively reduce $NO_x$, recent experimental data illustrates increased $SO_x$ levels, even with conventionally used desulfurization techniques, such as wet/dry flue gas desulfurization (FGD). This may be attributed to the oxidation of sulfur dioxide into sulfur trioxide resulting in opacity and stack plume issues. Further, sulfur trioxide negatively affects mercury sorbents. The sulfur trioxide ($SO_3$) competes for binding sites on the sorbent, and explains the continuing challenges at bituminous plants for mercury control. Similar challenges are noted at sub-bituminous or lignite-burning power plants, which implement certain sulfur oxides for conditioning fly ash in order to comply with particulate matter (PM) capture regulations.

Accordingly, there is a need in the industry for an apparatus or system for improved control of regulated emissions and a method of operating the apparatus.

BRIEF SUMMARY

An apparatus for controlling particulate and sulfurous emissions in a gas stream of a fuel fired system comprising: an aerosol formation means for creating a reactive aerosol; a precursor supply means connected to the aerosol formation means, for supplying the aerosol formation means; and a reactive aerosol supply means for supplying the reactive aerosol to the gas stream. The apparatus as described, wherein the reactive aerosol formation means comprises a thermal chamber with a precursor inlet for supplying an aerosol precursor to the chamber, and heating means for heating the chamber to vaporize the precursor.

A method for controlling particulate and sulfurous emissions in a gas stream of a fuel fired system comprising: producing a reactive aerosol; and supplying the reactive aerosol to the gas stream. The method, wherein producing a reactive aerosol further comprises introducing a precursor to a chamber and heating the precursor in the chamber to a temperature of at least about 1200° F. (688° C.).

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

In the drawings.

DETAILED DESCRIPTION OF THE PREFERRED EMBODIMENTS

As indicated above, the present invention may be used to assist in the removal of mercury contained in the flue gases produced during the combustion of fossil fuels, such as but not limited to coal, used in the production of steam for industrial uses and/or electric power generation. Persons skilled in the art, however, will appreciate that other combustion processes, such as those used in incinerators and the like, may also produce flue gases containing mercury species and the present invention may be applied to remove the mercury species from the flue gases produced by such equipment and processes. Further, the present invention may also be applied to other "partial oxidation" processes, such as coal gasification processes, which involve the partial oxidation or partial combustion of hydrocarbon feedstocks.

As described in an article titled "How Coal Gasification Power Plants Work", available at the United States Department of Energy website http://fossil.energy.gov/programs/powersystems/gasification/howgasificationworks.html, such partial oxidation processes may be considered not to be a conventional "combustion process" involving the hydrocarbon feedstock, which may still be coal, but rather a complex reaction in which most of the carbon-containing feedstock is chemically broken down under conditions of heat and pressure to produce a synthesis gas or "syngas." Syngas is comprised of hydrogen, carbon monoxide and other gaseous constituents.

Since the hydrocarbon feedstock may contain mercury, the syngas produced by such processes, as well as the flue gases produced during the subsequent combustion of the syngas, may include various mercury species. Accordingly, while the following disclosure may describe the present invention in the context of a typical coal-fired system, such as a coal-fired utility, industrial boiler or steam generator, it will be understood that the present invention may be applied to any type of combustion or partial oxidation process which produces a flue gas or synthesis gas (hereinafter referred to simply as gas) stream from which mercury species are to be removed.

Figure 1:
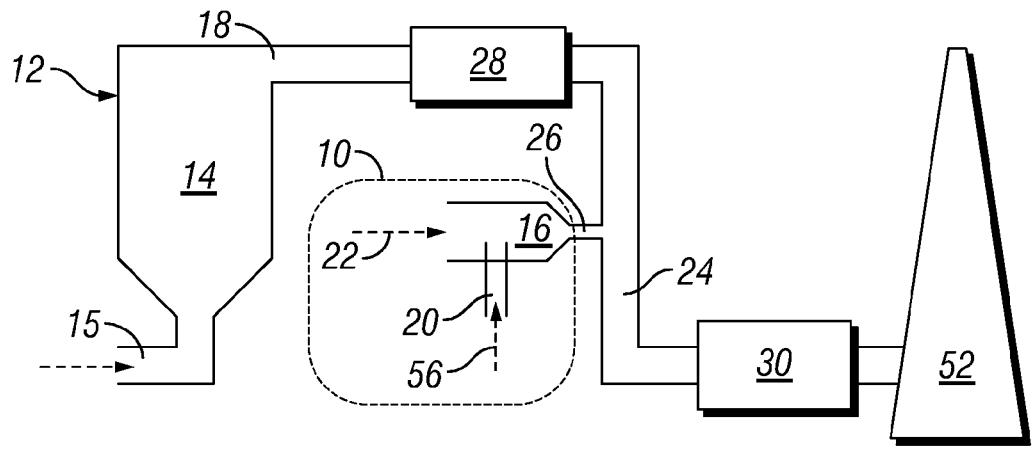
FIG. 1 is a schematic view of a high-energy halogen dissociation system applied in a coal-fired system according to an embodiment of the present disclosure.

Referring now to the drawings, in which like reference numerals are used to refer to the same or similar elements, FIG. 1 shows a conceptual schematic of a high-energy halogen dissociation system or apparatus 10, applied in a coal-fired system 12. A coal combustor 14 of the coal-fired system can be fired by means of a pulverized coal burner, a Cyclone furnace, or stoker firing, a bubbling bed or circulating fluidized-bed combustor, or any other type of coal combustor used in a coal-fired system or any coal gasification system, generally referred to as a fuel-fired system in this disclosure. Fuel is supplied schematically at fuel inlet 15. The dissociation apparatus 10 includes a high-energy halogen dissociation unit 16 installed at any location downstream of an outlet or exit 18 of the coal combustor 14 of the fuel fired system.

The halogen dissociation unit 16 is heated or energized by any available heating means including electric heating, plasma heating, and organic and inorganic compound combustion. The halogen-containing materials enter the dissociation chamber at halogen inlet 20, in any of their physical forms (i.e., gas, liquid, or solid) and are then dissociated into atomic, molecular, and/or radical forms by the addition of heat from the heating means.

The dissociated halogen species are then conveyed by means of a carrier gas supplied at carrier gas inlet 22, into the main gas stream conveyed along flue 24, while halogen quenching can occur either in a passageway 26 connecting the dissociation chamber 16 to the main gas stream in flue 24, or inside the flue 24. The quench rate can be controlled by either any available heat-transfer approaches or heat transfer between the high-energy halogen stream and the gas inside the flue 24. The reactive halogens, preserved by a high quenching rate, will efficiently oxidize elemental mercury vapor in the main gas stream and/or convert gaseous mercury into particulate-associated forms, and/or react with a mercury sorbent material to enhance mercury removal.

Additionally, for mercury oxidation only, the reactive halogen species can again be introduced at any location downstream of the outlet and/or exit 18 of a gasification system.

An air preheater 28 can be provided in the flue 24 at a location upstream of the passageway 26 and one or more pollutant control devices 30 of known construction can be provided downstream of the passageway 26 and upstream of a known stack 52 for discharging the exhaust gases from the system.

Figure 2:
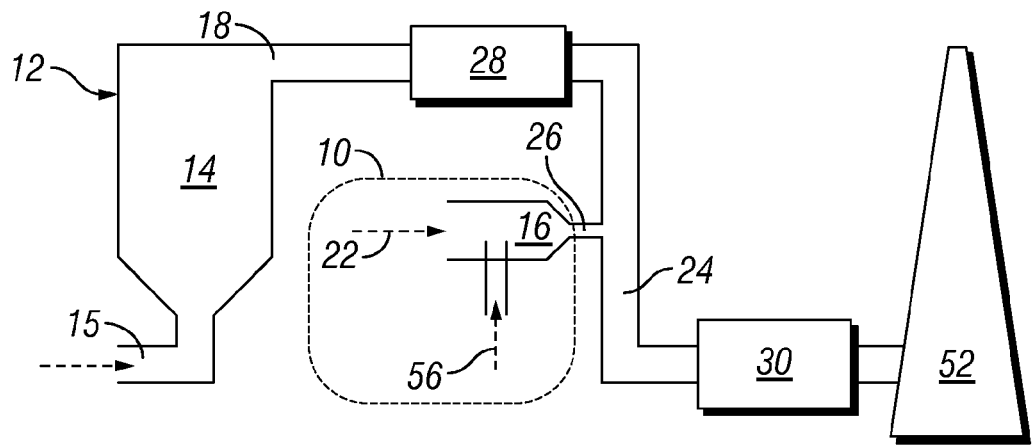
FIGS. 2, 3, 4, 5 and 6 are views similar to FIG. 1 of alternate embodiments of the disclosure.

FIG. 2 depicts an alternate embodiment of the invention. In this embodiment, carbonaceous precursor materials are also conveyed into the high-energy dissociation chamber 16, e.g. along the carrier gas inlet 22. By controlling the oxygen-to-carbon ratio in the dissociation chamber 16, the carbonaceous material will transform in situ into carbon black, char, or soot. The in situ-generated carbon black, char, or soot will mix with the dissociated halogens, and the halogen-treated carbon black, char, or soot will experience significant quenching and then oxidize and capture gaseous mercury from the gas stream inside the flue 24.

Figure 3:
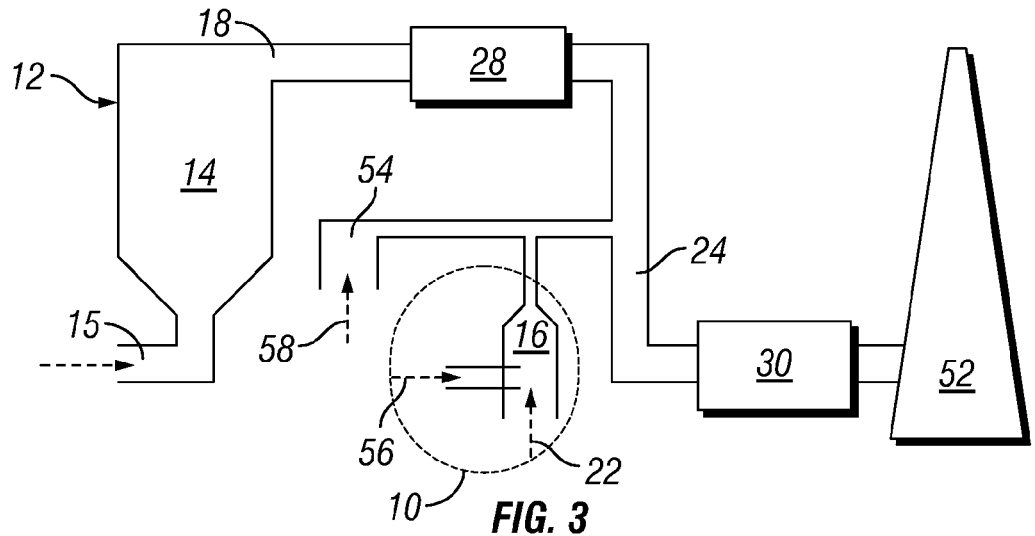

FIG. 3 is yet another alternate configuration of the current invention. In this configuration, carbon black, char, or soot is generated in situ in a separate unit 54 by either a thermal or arc process. The in situ-generated carbon black, char, or soot will be treated by the reactive halogens provided from halogen inlet 56 into chamber 16 during their transit to the main flue 24. This embodiment is also applied to dry prepared sorbent (e.g. activated carbon) injection technologies at carbon inlet 58, as shown in FIG. 3.

Figure 4:
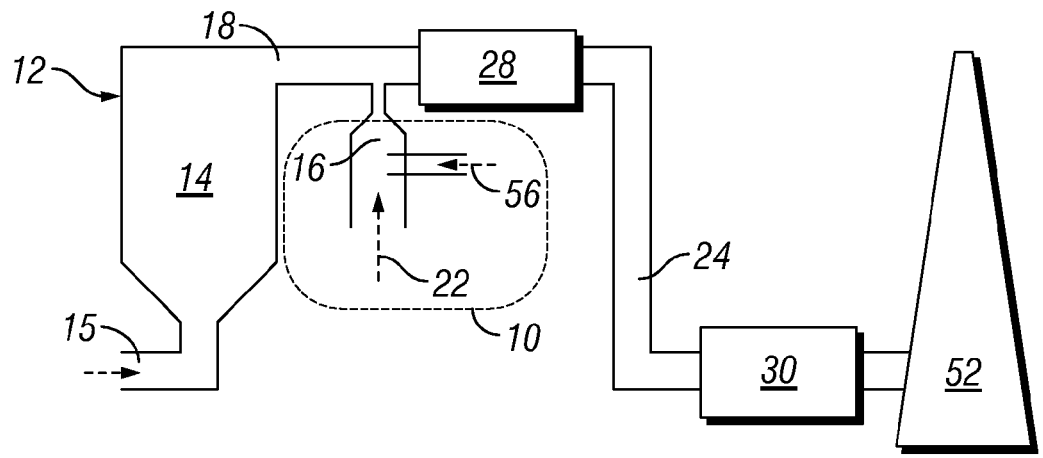
Figure 5:
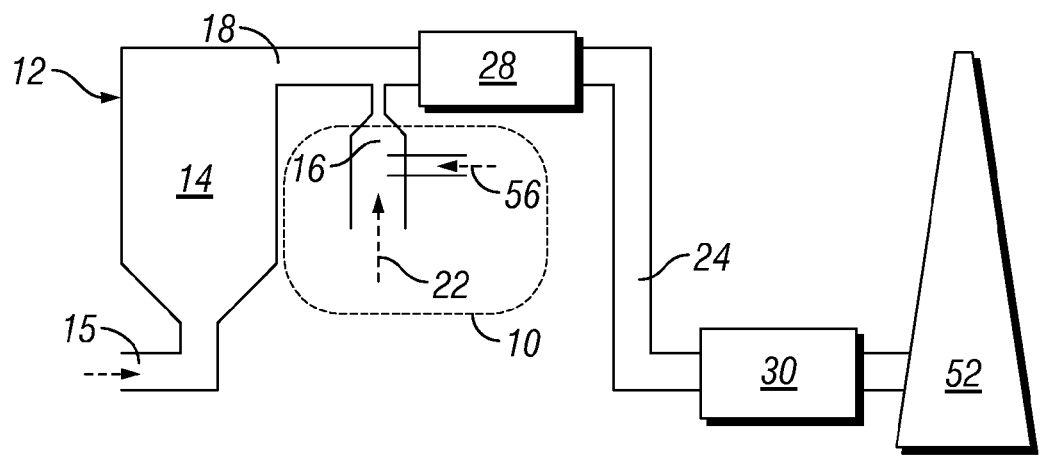
Figure 6:
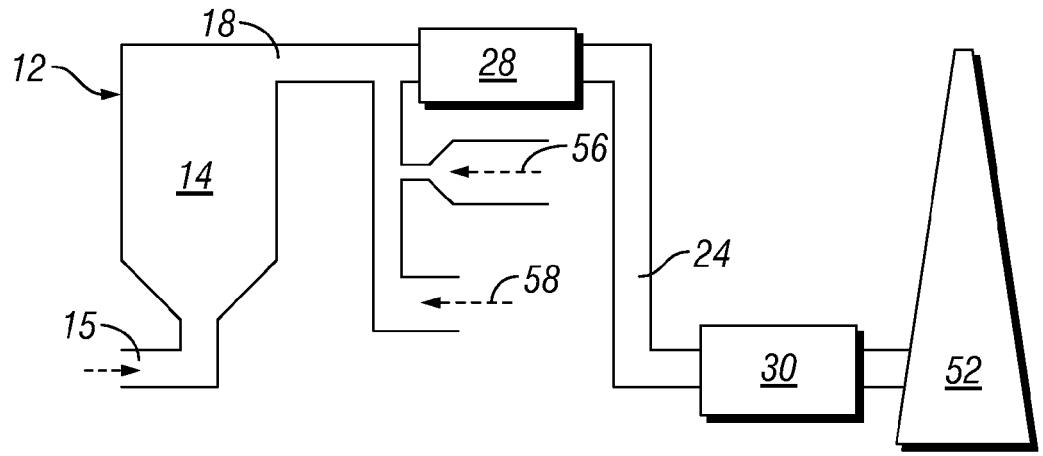

Note that FIGS. 2 and 3 are not meant to imply that the sorbent and carbon materials need to be co-injected at the same point into the flue 24, or that the injection location has to be downstream of the air preheater 28. The technology can be applied at any location downstream of the outlet or exit 18 of the fuel fired system as is illustrated in FIGS. 4, 5, and 6.

In another alternative embodiment, the halogen dissociation may take place in one or more dissociation chambers 16 and the reactive halogens may be subsequently supplied to the gas stream by the carrier gas via one or more passageways 26. In such an embodiment, a sorbent may or may not be supplied to each of the resulting one or more reactive halogen streams being supplied from the dissociation chambers 16 into the gas stream within the flue 24.

In yet another alternative embodiment, an SCR system may be positioned up- or downstream of the carrier gas inlet, wherein the dissociated reactive halogen is provided into the gas stream through the carrier gas inlet. In this embodiment, a sorbent may or may not be used.

In still another alternative embodiment, a sorbent bed may be placed downstream of the carrier gas inlet. The bed may be a fixed, moving, fluidized, or other type of sorbent bed commonly known in the art. In an embodiment where a sorbent is injected into the carrier gas stream, the injected sorbent facilitates an additional sorbent bed regeneration role and increase mercury oxidation due the increased residence time provided through bed suspension.

In order to improve pollutant removal in flue 24, a thermal aerosol generator 60 may be utilized. The thermal aerosol generator 60 can be a stand-alone unit used either for solely sulfur trioxide reduction, or as a fly ash-conditioning system installed upstream of a pollutant control device 30 such as a particulate trap. Moreover, the thermal aerosol generator 60 can couple or integrate with a mercury sorbent injection system or high-energy halogen dissociation apparatus 10 for mercury emission abatement.

Figure 7:
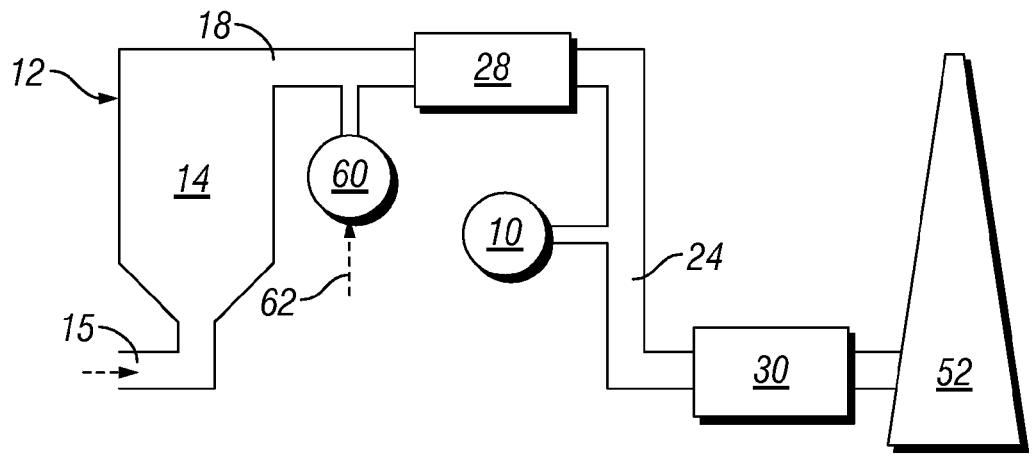
FIG. 7 is a schematic view of a thermal aerosol generator system applied in a coal fired system according to an embodiment of the present disclosure.
Figure 8:
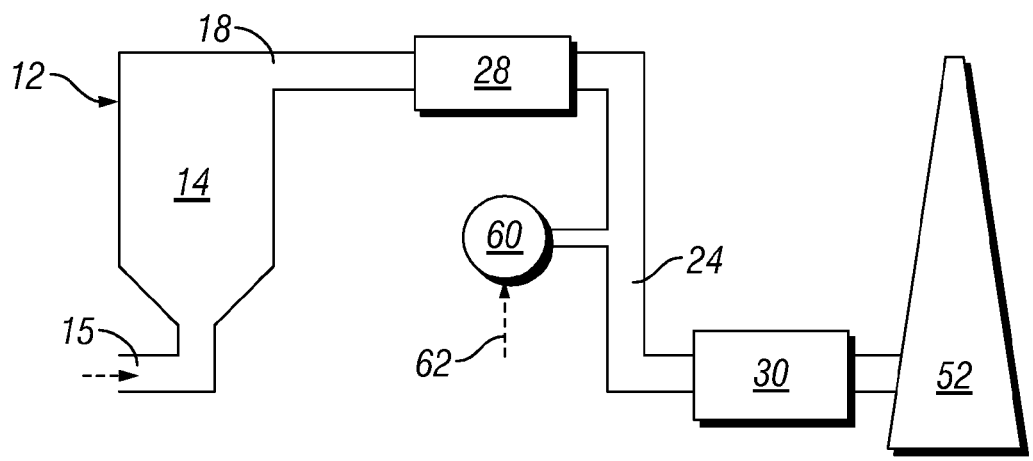
FIGS. 8 and 9 are views similar to FIG. 7 of alternate embodiments of the disclosure.
Figure 9:
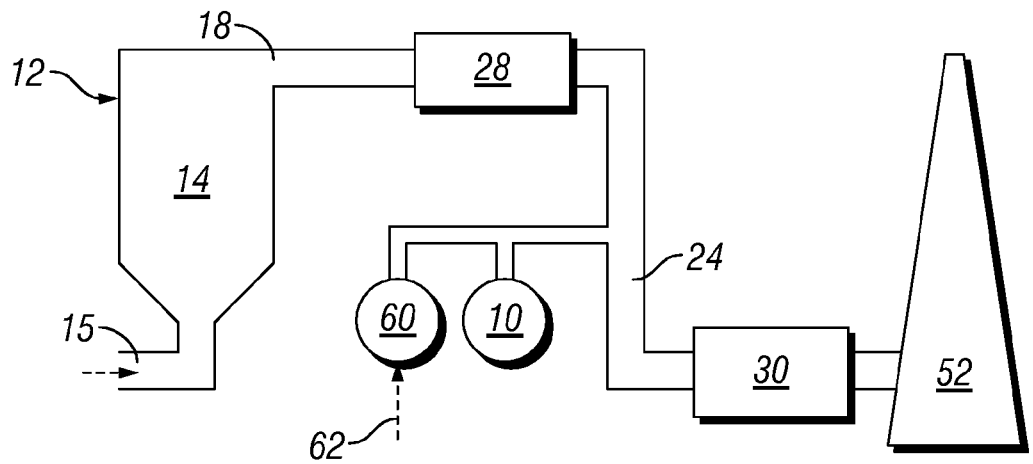
Figure 10:
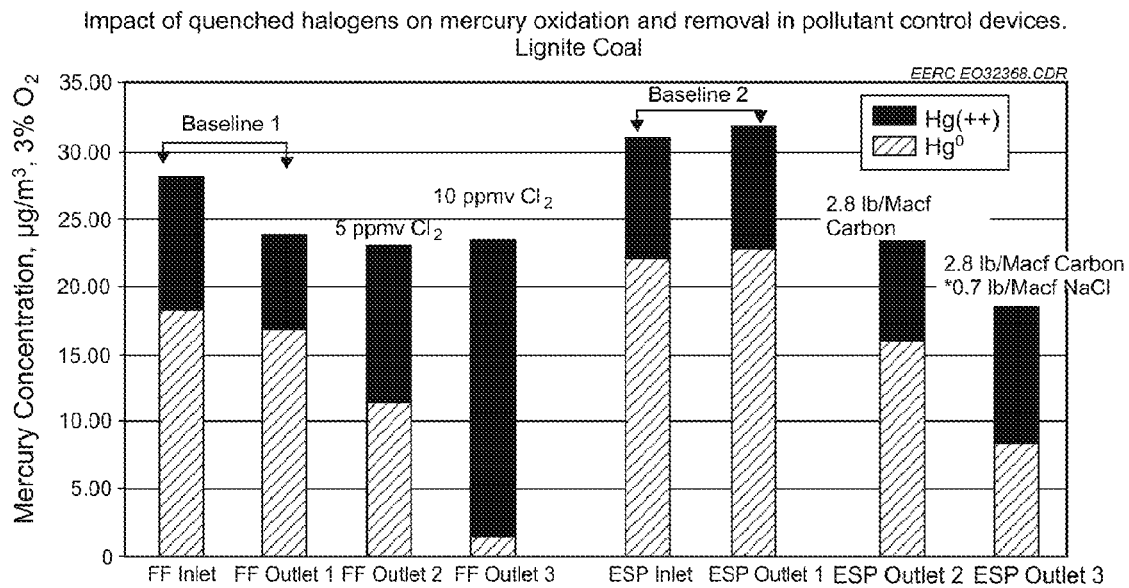
FIG. 10 is a bar chart containing data generated in a pilot-scale combustion test burning Texas lignite.
Figure 11:
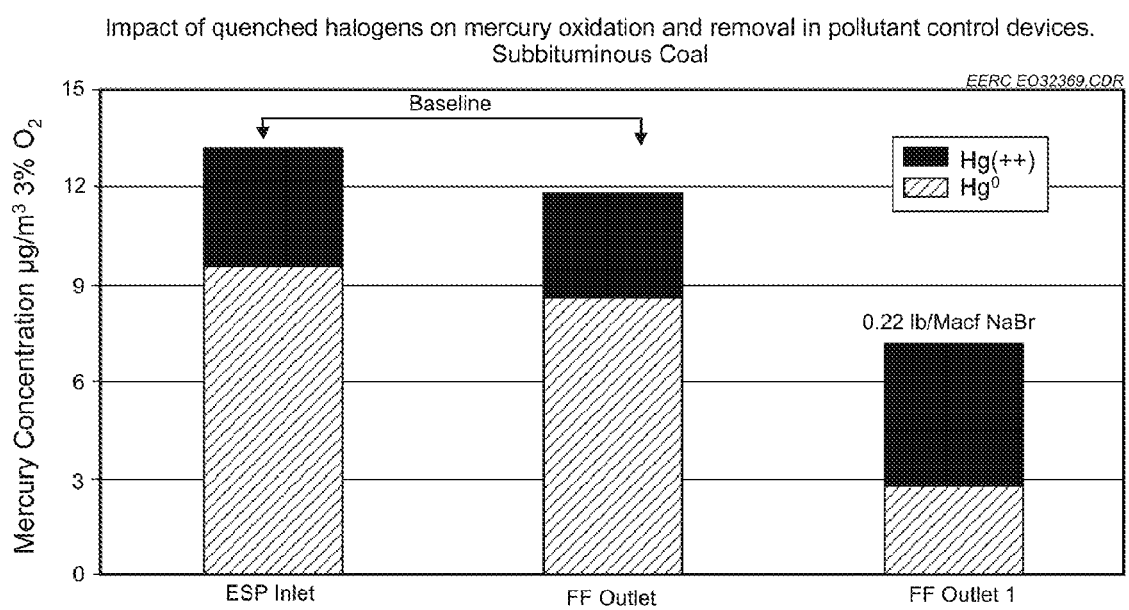
FIG. 11 is a bar chart containing data for dissociated-bromine injection in a sub-bituminous flue gas in a fabric filter (FF) configuration but without carbon injection.
Figure 12:
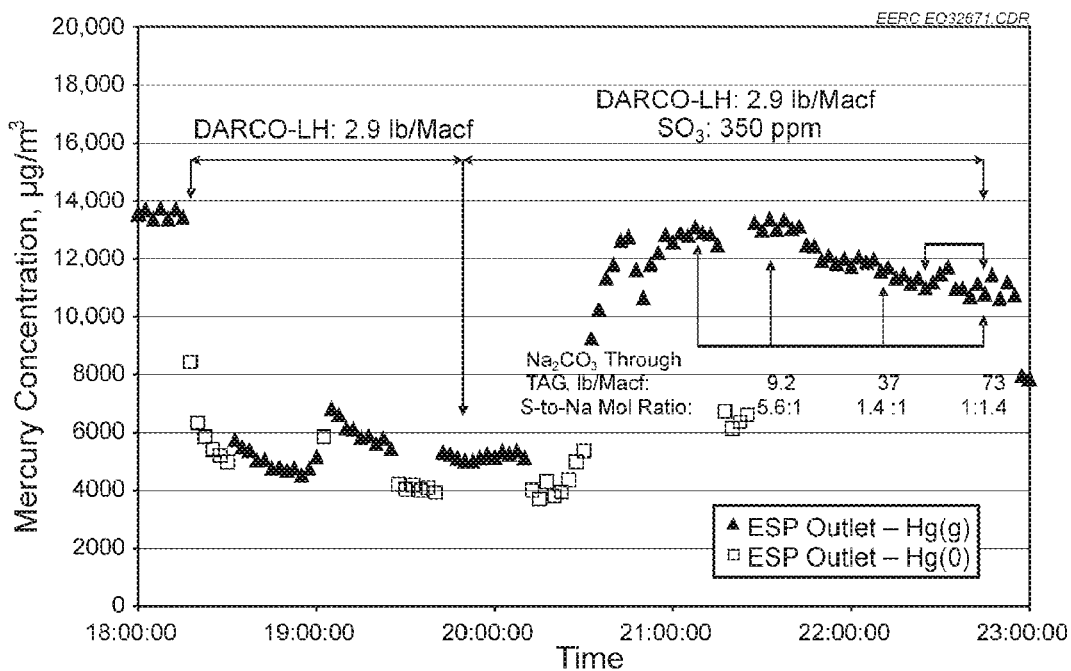
FIG. 12 is a graph of one coal fired plant's mercury emission at the electrostatic precipitate flue gas outlet.

The thermal aerosol generator 60 may be installed at any location downstream of the outlet 18 and upstream of at least one pollutant control device 30. In certain instances, thermal aerosol generator 60 may be disposed at any location along flue 24 that is suitable for placing halogen dissociation system 10. In specific embodiments, as illustrated in FIG. 7, the thermal aerosol generator 60 is positioned along flue immediately downstream of outlet 18 and upstream of the air preheater 28. In alternative embodiments, the thermal aerosol generator is positioned downstream of the air preheater 28, as illustrated in FIG. 8. Moreover, the thermal aerosol generator 60 can couple or integrate with a mercury sorbent injection system or high-energy halogen dissociation apparatus 10 for mercury emission abatement as illustrated in FIG. 9. Preferably, the thermal aerosol generator 60 is positioned before the last pollutant control device 30 disposed along flue 24. In certain instances, last pollutant control device 30 comprises a particulate trap, such as a device configured for electrostatic precipitation (ESP).

In certain embodiments, the thermal aerosol generator 60 utilizes finely dispersed alkaline, alkaline-earth compounds, and/or other silica/alumina-based materials as aerosols that can be prepared in advance or dynamically. These materials are injected into thermal aerosol generator 60 via inlet stream 62. Most preferably, a thermal aerosol generator 60 is utilized to generate vapor and/or fume containing alkaline and/or alkaline-earth compounds. Other supplemental materials including carbon black and/or transient metal oxides such as $Fe_2O_3$ may also be fed into the thermal aerosol generator 60 during the operation to accelerate the rates of vaporization and/or decomposition of these materials. Suitable precursors including NaBr, $CaBr_2$, $Na_2CO_3$, $NaNO_3$, $MgBr_2$, NaCl, calcium acetate, calcium magnesium acetate, sodium acetate, $SiCl_4$, and $Al(iPrO)_3$ may be used in thermal aerosol generator 60.

The alkaline, alkaline-earth, and/or silica/alumina-containing materials enter the thermal aerosol generator 60 in any of their physical forms, such as without limitation, gas, liquid, or solid. Alternatively, alkaline, alkaline-earth, and/or silica/alumina-containing materials enter the thermal aerosol generator 60 as a gas, liquid, or solid dispersed in a solvent. Examples of suitable solvents include water, organic solvents, or inorganic solvents. In certain embodiments, precursors, including NaBr, $CaBr_2$, $Na_2CO_3$, $NaNO_3$, $MgBr_2$, NaCl, calcium acetate, calcium magnesium acetate, sodium acetate, $SiCl_4$, and $Al(iPrO)_3$, enter the thermal aerosol generator 60 in any of their physical forms, such as without limitation, gas, liquid, or solid. Alternatively, precursors enter the thermal aerosol generator 60 as a gas, liquid, or solid dispersed in a solvent.

In thermal aerosol generator alkaline, alkaline-earth compounds, and/or silica/alumina material will vaporize and/or decompose into fumes (vapors) in the high-temperature reactor during operation. The aerosol dynamic process is governed by nucleation, condensation, and particle coagulation occurring either within the reactor or in the main flue gas stream. The derived vapor and/or fume will then be conveyed into flue 24 in which the generated aerosols react with the flue gas. In further embodiments, a solvent mediates aerosol formation.

The thermal aerosol generator 60 is heated or energized by any available means, including electric heating, plasma heating, and organic and inorganic compound combustion. The thermal aerosol generator is operated at a temperature of at least about 575° F. (300°C.), alternatively 1200° F. (688° C.); preferably, the temperature is greater than about 2000° F. (1093° C.). In operation, the lowest operating temperature for the aerosol reactor is above about 1620° F. (882° C.). Alternatively, the operating temperature is at least about the boiling point of sodium. In further, exemplary instances, the temperature in the thermal aerosol reactor is at least about 300° C. for $Al(iPrO)3$, 350° C. for calcium magnesium acetate, or at least about 800° C. for $SiCl_4$ and $SiBr_4$. The aerosols produced in thermal aerosol generator 60 may be injected at elevated, above ambient, temperature, thereby minimizing pollutant condensation on cold surfaces.

Without wishing to be limited by any particular theory, the size and morphology of the generated aerosols can be manipulated by adjusting the temperature-time within the thermal aerosol generator 60. The quenching rate by flue gas also affects the characteristics of the generated aerosols. In embodiments, the thermal aerosol generator 60 is configured to produce aerosols of that are less than about 2 μm in diameter; more preferably, the aerosols are less than about 1 μm, with open-agglomerate structure. The generated aerosols are very reactive with sulfur oxides due to high affinity between sulfur oxides and alkaline and alkaline-earth elements in the aerosols and the favorable mass transfer from the bulk gas phase to the sub-micrometer sized particles. The generated aerosols may have high specific envelope surface area as a result of their fine size and open-agglomerate, not porous, structure, for a maximum utilization of the aerosol for sulfur adsorption by minimizing the blockage of the binding site from sulfate compounds formed on the surface of the aerosols. In further instances, a solvent with dispersed alkaline, alkaline-earth, and/or silica/alumina-containing materials may aid in obtaining the desired aerosol size in flue 24. Additionally, a solvent with precursors, including NaBr, $CaBr_2$, $Na_2CO_3$, $NaNO_3$, $MgBr_2$, NaCl, calcium acetate, calcium magnesium acetate, sodium acetate, $SiCl_4$, and $Al(iPrO)_3$, may aid in generating the desired aerosol size.

The small size of the generated aerosols can efficiently capture sulfur trioxide ($SO_3$) droplets in flue gas through particle coagulation. Therefore, the amount of alkaline and alkaline-earth elements needed for sulfur trioxide removal is reduced because of the fast kinetics between the sorbent and sulfur trioxide and the efficient utilization of the sorbent. As previously discussed, the generated aerosols can be injected at elevated temperatures, thereby minimizing $SO_3$ condensation on cold surfaces.

Furthermore, adsorbing sulfur trioxides from flue gas reduces the poisoning effect of sulfur trioxides on injected mercury sorbents, such as powdered activated carbon. As understood by one skilled in the art, sulfur species, especially sulfur trioxide, compete against mercury for binding sites on mercury sorbents. By coupling the thermal aerosol generator 60 with mercury sorbent injection technology, mercury sorbent performance can be improved. A thermal aerosol generator 60 may reduce the amount of mercury sorbent used in pollutant control device 30.

It can be envisioned that a system, device, apparatus, or any feedback means, as understood by one skilled in the art, may control thermal aerosol generator 60 in order to optimize performance of pollutant control device 30. In certain instances, it can be envisioned that thermal aerosol generator 60 is differentially controlled by a feedback means, wherein the quantity of aerosols injected into flue 24 are commensurate with a measured quantity of pollutants to be removed from the gas stream therein. Pollutant control device 30 may further include an analytical means. Alternatively, stack 52 may comprise an analytical means. Without wishing to be limited by theory, producing the reactive aerosol on-site and differentially controlling dispersion into flue 24, prevents having to re-disperse aerosol precursors into gas stream, and allows real-time response to changes in emissions.

Additionally, the implementation of thermal aerosol generator 60 along flue 24 conditions fly ash for particulate capture with electrostatic precipitation (ESP) in a pollutant control device 30. Fly ash with high electric resistivity has been a challenge for particulate matter collection with ESP, as understood by one skilled in the art. Pollutant control devices 30, such as an electrostatic precipitator, have been widely used for coal-fired power plants as the primary particulate matter control device. High electric resistivity not only makes it difficult to charge fly ash but also induces back corona within an ESP. In order to improve ESP performance, sulfur trioxide has been used to alter the electric resistivity of fly ash. The alkaline, alkaline-earth, and/or silica/alumina additive from the thermal aerosol generator provides a different approach to adjust fly ash electric resistivity. The small-sized aerosols are capable of enhancing the surface characteristics of the fly ash, or modifying fly ash, through coagulation between particles. For example, without limitation, with the attached alkaline and/or alkaline-earth elements, the electric resistivity of the fly ash can be altered to enhance ESP performance, or altered to enhance caking properties for improved filtration performance.

While the foregoing Figures and description describe the present invention and alternatives thereof as applied to a fuel fired system, it is understood that the present invention may also be utilized in any process producing a mercury containing gas without departing from the teachings of the present invention. It should be understood that modifications thereto may be made by one skilled in the art without departing from the spirit and scope of the invention. Although the present invention and its advantages have been described in detail, it should be understood that various changes, substitutions, and alterations may be made herein without departing from the scope of the invention as defined by the appended claims. Likewise, the sequential recitation of steps in the claims is not intended to require that the steps be performed sequentially, or that a particular step be completed before commencement of another step.

EXAMPLE

Development and Testing

The EERC has completed a series of tests to verify the present invention and prove the potential of this technology for efficient control of mercury emissions with reduced cost and minor impacts on plant operation. This invention is a method that uses in situ-generated alkaline, alkaline-earth, and/or silica/alumina aerosols as a multifunctional additive to scavenge sulfur oxides in flue gas, minimize poisoning effects of sulfur oxides on mercury sorbent performance, and enhance PM capture in ESPs and baghouses by conditioning the fly ash.

To achieve the stated goal, the method utilizes a thermal aerosol generator (TAG) to in situ synthesize vapor and/or fume containing alkaline, alkaline-earth compounds, and/or silica/alumina through vaporization followed by nucleation, condensation, and particle coagulation. Reaction products of the alkali and alkaline-earth metals with water vapor or $SO_2$ are still basic and can react with $SO_3$ while in a dispersed form.

$$\text{e.g., } Na^o(g)+H_2O(g)\rightarrow NaOH(g)+\tfrac{1}{2}H_2(g)$$

$$Na^+(g)+H_2O(g)\rightarrow NaOH(g)+H^+(g)$$

$$NaOH(g)+SO_3\rightarrow NaHSO_4(g)$$

Dispersed forms of silica and/or alumina can also serve as condensation sites for $SO_3$.

The in situ-generated aerosols are well dispersed in flue gas and have enormous specific envelope surface area as a result of the fine size and open-agglomerate structure of the aerosols. The fine-sized aerosols are very reactive with sulfur trioxide because of the fast kinetics between sulfur and alkaline and alkaline-earth elements and full utilization of the sorbent as a result of the open-agglomerate structure. The fast kinetics are due to the highly dispersed nature of the alkali, alkaline-earth, and/or silica/alumina aerosols, which provide excellent nucleation/condensation/reaction sites.

FIG. 10 contains data generated in a pilot-scale combustion test burning Texas lignite. The flue gas was exhausted through an electrostatic precipitator/fabric filter (ESPIFF) configuration and halogen dissociation tests were completed in both ESP and FF modes to evaluate the effect on mercury oxidation and capture. In the ESP test, both activated carbon and dissociated halogens were injected into flue gas entering the ESP.

FIG. 10 shows dissociated chlorine from a Cl precursor added before the FF and dissociated chlorine from a NaCl precursor added before the ESP.

NaCl solution was selected, atomized into aerosol form, and fed into the dissociation chamber. The high energy-dissociated halogens were introduced into the main flue gas stream, where they contacted the activated carbon, resulting in the oxidation of mercury on the carbon surface. In the baseline test with no dissociated-halogen addition, 2.8 lb/fMac carbon injection into the ESP slightly reduced mercury emissions from 28 (inlet) to 23.2 μg/dNm³ of Hg(g) in the outlet with a very small reduction in elemental to 15.8 μg/dNm³ $Hg^o$. Compared to this small mercury capture across the ESP, by adding dissociated chlorine from 0.7 lb/Macf of NaCl combined with 2.8 lb/Macf carbon injection, the mercury emissions out of the ESP reduced to 18.1 μg/dNm³ of Hg(g) and with 54% of the mercury oxidized.

Another test was completed by injecting a quenched high-energy-dissociated $Cl_2$ gas into the FF (but with no activated carbon injection). Although there was no significant improvement on mercury capture, over 60% of Hg(g) was oxidized with only 5 ppmv quenched high-energy C1, injection into the FF, and this increased to over 90% oxidized mercury at the FF outlet with 20 ppmv $Cl_2$ injection. Mercury in Texas lignite flue gas is very difficult to oxidize and capture because of its high mercury and low chlorine contents and the presence of selenium. The current results are encouraging and indicate that quenched high-energy halogens are able to efficiently oxidize mercury and improve mercury control.

The invention was also evaluated for dissociated bromine injection in a sub-bituminous flue gas in a FF configuration but with no carbon injection. With introduction of dissociated bromine from only 0.22 lb/Macf NaBr into the FF, mercury emissions at the FF outlet reduced to 7.1 μg/dNm³ Hg(g) with 62% oxidized mercury. See FIG. 11. Compared to the FF mercury emissions of 11.7 μg/dNm³ of Hg(g) with 72.6% $Hg^o$ in the baseline, the current technology again proved its effectiveness on mercury oxidation and control.

The EERC results have demonstrated the potential of this technology for mercury oxidation and control. It can be applied to any fossil fuel-fired system equipped with a pollution control device including but not limited to ESP, FF, wet flue gas desulfurization (WFGD), and spray dryer apparatus.

Sulfur trioxide deteriorates mercury sorbent performance in coal flue gas and alkaline and/or alkaline-earth-containing fume that is formed in situ in a thermal aerosol generator is able to overcome the $SO_3$ poisoning effect. FIG. 12 contains data generated in a pilot-scale combustion test burning Eagle Butte, a sub-bituminous coal facility. With 2.9 lb/Macf DARCO-LH injection into the ESP, mercury concentration at the ESP outlet was reduced to 5.2 μg/dNm³, compared to 13.4 μg/dNm³ of mercury emission in a baseline test. Then approximately 350 ppm $SO_3$ was added into the flue gas while the injection of DARCO-LH was kept at 2.9 lb/Macf. As a result, of $SO_3$ injection, mercury emission at the ESP outlet increased to 12.8 μg/dNm³, clearly indicating that $SO_3$ poisoned the injected DARCO-LH, making it much less effective at capturing mercury. At the end of the test, sodium carbonate was fed through a TAG to form sodium-containing fume, which was then injected into a duct upstream of the carbon injection. The generator temperature was maintained around 2000° F. during the testing period. Mercury concentration at the ESP outlet was reduced to 10 μg/dNm³ when the mole ratio of $SO_3$ to injected sodium reached 1:1.4, indicating the potential of this technology for improving mercury sorbent performance by scavenging sulfur trioxide in flue gas.

Figure 13:
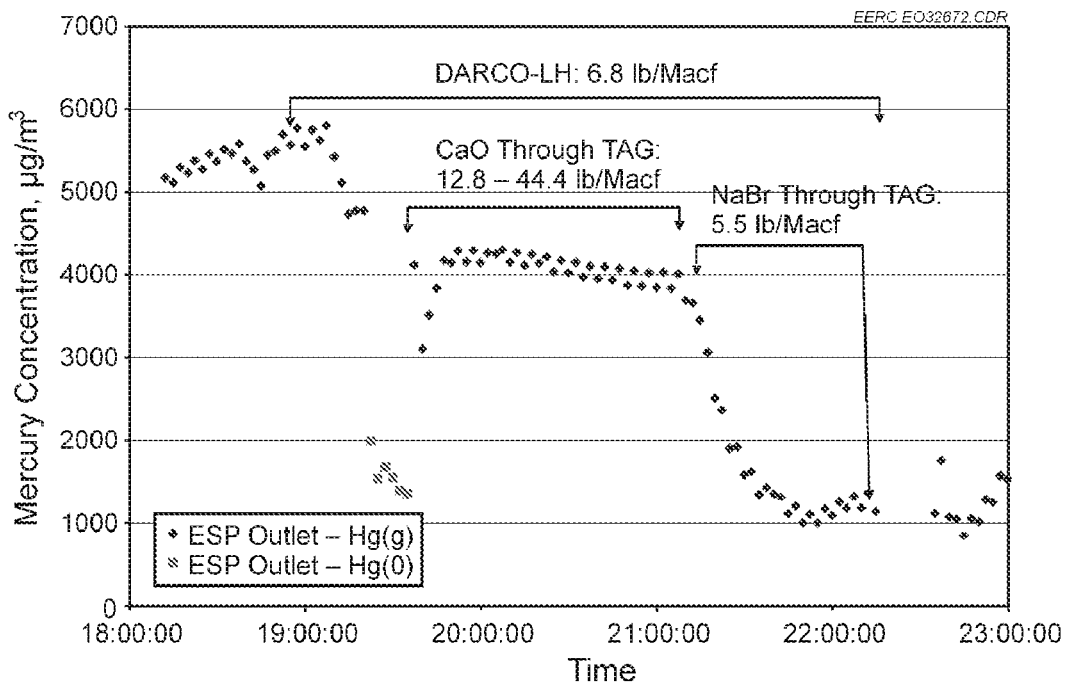
FIG. 13 is a graph of another coal-fired plant's mercury emission at the electrostatic precipitate flue gas outlet.

Another test was completed in flue gas derived from combusting Illinois coal, which has approximately 3.5% sulfur content. Condensation $SO_3$ sampling data show 26 ppm $SO_3$ in the Illinois coal flue gas. FIG. 13 plots mercury emission at the ESP outlet during the testing period. Injection of 6.8 lb/Macf DARCO-LH into the ESP only reduced mercury emission to 4.8 μg/dNm³, a marginal mercury capture by the bromine-treated carbon sorbent at such a high injection rate, compared to 5.6 μg/dNm³ mercury emissions at the baseline test. Calcium oxide was then added into the flue gas upstream of the carbon injection location with varying rates from 12.8 to 44.4 lb/Macf through the TAG, and the mercury emission dropped below 4 μg/dNm³. With 5.5 lb/Macf NaBr through the TAG and into the ESP, mercury concentration at the ESP outlet was dramatically decreased to 1.2 μg/dNm³ because of the combined contribution from sodium and bromine.

The above testing only demonstrated the concept; optimization has not been done to improve TAG performance to maximize the beneficial effect on mercury sorbent performance.

EERC preliminary results have demonstrated the potential of this technology for mercury control and sulfur trioxide reduction. It can be applied to any coal-fired system equipped with a pollutant control device including, but not limited to, an ESP, a fabric filter, wet flue gas desulfurization (WFGD), a spray dryer, or SCR.

We claim:

1. A method for controlling particulate and sulfurous emissions in a gas stream of a fuel fired system comprising:
   providing a main flue coupled to an outlet of the fuel fired system for carrying the gas stream
   producing a reactive aerosol in a chamber of a thermal aerosol generator by nucleation, condensation and particle coagulation, wherein the thermal aerosol generator is connected, via a passageway to the main flue;
   introducing the reactive aerosol to the main flue via the passageway, whereby at least a portion of the reactive aerosol is reacted via chemical reaction with particulate sulfurous species in the gas stream, producing reacted aerosol particles; and
   removing at least a portion of the reacted aerosol particles from the main flue.

2. The method according to claim 1, wherein producing a reactive aerosol further comprises:
   introducing a precursor to the chamber; and
   heating the precursor in the chamber to a temperature of at least about 575° F. (300° C.).

3. The method according to claim 2, wherein the precursor is selected from the group consisting of: NaBr, $CaBr_2$, $Na_2CO_3$, $NaNO_3$, $MgBr_2$, NaCl, calcium acetate, calcium magnesium acetate, sodium acetate, $SiCl_4$, $Al(iPrO)_3$, alkaline, alkaline-earth compounds, silica/alumina-based materials, and combinations thereof.

4. The method according to claim 2, wherein heating the precursor comprises heating to a temperature of at least about 1200° F. (688° C.).

5. The method according to claim 2, wherein heating the precursor comprises heating to a temperature of at least about 1620° F. (882° C.).

6. The method according to claim 2, wherein heating the precursor comprises heating to a temperature of at least about 2000° F. (1093° C.).

7. The method according to claim 1, further comprising introducing a sorbent to the main flue, whereby the sorbent captures mercury from the gas stream.

8. The method according to claim 7, wherein the reactive aerosol and the sorbent are introduced into the main flue via the passageway.

9. The method according to claim 7, wherein the sorbent is a carbonaceous material selected from the group consisting of carbon black, char, soot, and combinations thereof.

10. The method according to claim 1, further comprising providing an air preheater in the main flue, and introducing the reactive aerosol to the main flue between the fuel fired system and the air preheater.

11. The method according to claim 10, further comprising providing a pollution control device downstream of the air preheater.

12. The method according to claim 11, wherein the pollution control device is selected from the group consisting of electrostatic precipitators, fabric filters, wet flue gas desulfurization devices, spray dryers, baghouses, and combinations thereof.

13. The method according to claim 1, further comprising providing an air preheater in the main flue, and supplying the reactive aerosol and a sorbent to the main flue between the fuel fired system and the air preheater.

14. The method according to claim 13, further comprising providing a sorbent bed downstream of the location where the reactive aerosol is supplied to the main flue.

15. The method according to claim 1, further comprising providing an air preheater in the main flue, wherein the passageway is connected to the main flue between the air preheater and a pollution control device.

16. A The method according to claim 15, wherein the pollution control device is a particulate capture device.

17. The method according to claim 16, wherein the particulate capture device comprises an electrostatic particulate capture device.

18. The method according to claim 1, wherein producing a reactive aerosol comprises producing an aerosol that is less than about 2 μm in diameter.

19. The method according to claim 1, wherein producing a reactive aerosol comprises producing an aerosol that is less than about 1 μm in diameter.

20. The method according to claim 2, wherein the precursor is introduced to the chamber as a phase selected from the group consisting of liquids, solids, vapors, and combinations thereof.

21. The method according to claim 16, wherein the particulate capture device comprises a fabric filter device.

22. The method according to claim 16, wherein the particulate capture device comprises a wet flue gas desulfurization (WFGD) device.

23. The method of claim 1 further comprising introducing dissociated halogen species into the main flue.

24. The method of claim 23 wherein the dissociated halogen species are introduced into the passageway downstream of the aerosol generator.

* * * * *